US008193907B2

(12) United States Patent
Lindskog

(10) Patent No.: US 8,193,907 B2
(45) Date of Patent: Jun. 5, 2012

(54) METHOD FOR OPENING A TRANSPORTABLE CONTAINER

(75) Inventor: Kjell Lindskog, Skelleftea (SE)

(73) Assignee: SQS Security Qube System AB, Skelleftea (SE)

( * ) Notice: Subject to any disclaimer, the term of this patent is extended or adjusted under 35 U.S.C. 154(b) by 1085 days.

(21) Appl. No.: 10/502,018

(22) PCT Filed: Jan. 22, 2003

(86) PCT No.: PCT/SE03/00103

§ 371 (c)(1),
(2), (4) Date: Dec. 27, 2004

(87) PCT Pub. No.: WO03/064799

PCT Pub. Date: Aug. 7, 2003

(65) Prior Publication Data

US 2005/0122228 A1 Jun. 9, 2005

(30) Foreign Application Priority Data

Jan. 22, 2002 (SE) ...................................... 0200169

(51) Int. Cl.
*B60R 25/00* (2006.01)
*G05B 19/00* (2006.01)
*H04B 1/00* (2006.01)

(52) U.S. Cl. ..................... 340/5.73; 340/5.28; 340/5.33; 340/5.1; 70/337

(58) Field of Classification Search ................. 340/5.73, 340/5.28, 5.33, 5.2, 5.1, 5.26, 825.69, 539.1, 340/988, 825.49, 426.19, 539.22, 568.1; 70/337; 235/382; 109/25, 29, 36, 33
See application file for complete search history.

(56) References Cited

U.S. PATENT DOCUMENTS

| | | | | |
|---|---|---|---|---|
| 3,654,880 | A * | 4/1972 | Schesso | 109/25 |
| 4,236,463 | A * | 12/1980 | Westcott | 109/33 |
| 4,649,833 | A | 3/1987 | Cummins | |
| 4,851,652 | A * | 7/1989 | Imran | 235/382 |
| 5,164,718 | A | 11/1992 | Cedergren | |
| 5,705,991 | A * | 1/1998 | Kniffin et al. | 340/5.28 |
| 6,384,709 | B2 * | 5/2002 | Mellen et al. | 340/5.2 |
| 6,430,689 | B1 * | 8/2002 | Lacombe et al. | 713/168 |
| 6,701,854 | B1 * | 3/2004 | Gral | 109/25 |
| 7,212,098 | B1 * | 5/2007 | Trent et al. | 340/5.3 |

FOREIGN PATENT DOCUMENTS

| | | |
|---|---|---|
| FR | 2804994 | 8/2001 |
| WO | 8703034 | 5/1987 |

* cited by examiner

*Primary Examiner* — Nam V Nguyen
(74) *Attorney, Agent, or Firm* — Mark P. Stone

(57) ABSTRACT

The present invention relates to a process for opening a container for the transportation of valuable objects or valuable documents, for example. The container (1) includes a first electronic unit (2), which allows deactivation of an alarm system and/or opening of the container. A first key (10) required to open the container includes a second electronic unit (12), which communicates with the first electronic unit (2) such as to initiate opening of the container. There is used a stationarily disposed second key (20) which together with the first key (10) provides the complete code-set (ABCD) required to initiate deactivation and/or opening of the container (1). The stationarily disposed second key (20) includes a third electronic unit (22) which contains a subset (CD) of the complete code-set (ABCD) required to initiate deactivation and/or opening of the container (1). The electronic unit (12) of the first key (10) contains a subset (AB) of the complete code (ABCD) required to initiate deactivation and/or opening of the container (1). The inventive process ensures that the container (1) will be opened at the correct geographic destination and, when necessary, also within a determined time span.

20 Claims, 1 Drawing Sheet

METHOD FOR OPENING A TRANSPORTABLE CONTAINER

Figures 1, 2, 3:
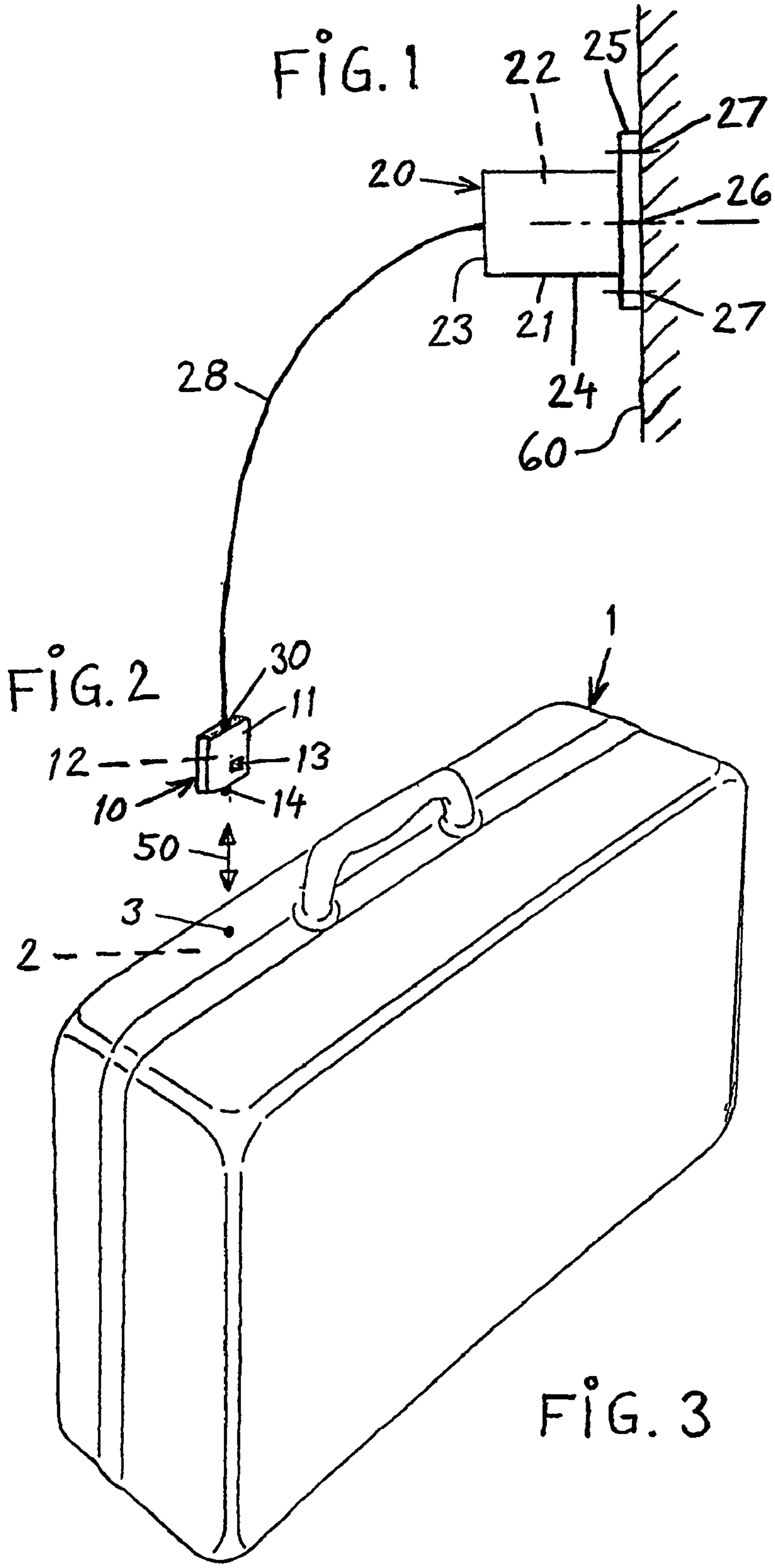

The present invention relates to a process of opening a transportable container, according to the preamble of claim 1.

With regard to containers or so-called safety bags for the transportation of valuable objects or valuable documents, for instance, there is a need for a code-based container opening procedure that incorporates a high level of security.

Unfortunately, a key that permits the deactivation and/or opening of the transportable container as a result of theft or some other criminal activity can land in the wrong hands, so as to enable the container to be deactivated and/or opened at a geographical position other than its intended destination.

One object of the present invention is to provide an extremely attractive and safe procedure that will ensure that the alarm of a mobile/transportable container will be deactivated and/or the container will be opened at the geographically correct place. This object is achieved with the procedure comprising the steps set forth in the characterising clauses of respective accompanying claims.

Among the many advantages afforded by the present invention can be mentioned that the inventive procedure provides a very high security level and economic advantages. Deactivation of the alarm of the mobile container and/or opening of said container at places other than the intended destination can be prevented, even when unauthorised persons are in possession of said key. This effectively prevents so-called insider burglary, and the loss of the key will not constitute a security risk.

The invention will now be described in more detail with reference to an exemplifying embodiment thereof and also with reference to the accompanying drawings, in which FIG. 1 is a schematic side view of a stationary second key;

FIG. 2 is a schematic perspective view of a loose and transportable first key; and FIG. 3 is a schematic perspective view of a transportable container in the form of a so-called security bag or case.

The transport container 1 shown in FIG. 3 exemplifies a sealable storage space that can be opened by code-actuation. The illustrated container 1 constitutes a safety container/safety cassette whose outer casing is alarmed to indicate any attempts to force holes in the casing or attempts to bend the casing apart or any other unauthorised attempt to open the container. Arranged in the container 1 is a first electronic unit 2 and a requisite source of electric current. The electronic unit 2 is adapted to activate immediately a destructive agent or some corresponding means placed in the container in response, e.g., to a signal current circuit/alarm current circuit being broken, so as to destroy or bring influence to bear on the valuable contents stored in the storage space in the container 1 at that moment in time. Activation and deactivation of the alarm circuit/alarm system and the electronic unit is effected by an appropriate high security code system. The afore-described transport container 1 may be used, for instance, to transport valuable objects between different places, wherewith subsequent to placing valuable objects in the casing, such as banknotes, documents, computer disks, etc., the container 1 is closed and the alarm system activated prior to delivery of the container to its intended destination, whereafter the container is opened on the basis of a code at said destination, by authorised deactivation of the alarm system with the aid of a key, therewith enabling the container 1 to be opened without destruction of the container contents by said destruction means. The container can then be emptied and reloaded, and so on.

Shown in FIG. 2 is a first key 10 which is designed to enable the alarm to be deactivated and/or the mobile container 1 to be opened. The key 10 includes a capsule 11 in the form of an outer casing which is alarmed in a manner such as to indicate all types of unlawful manipulation, such as attempts to make holes in the capsule or to open the same. The casing or encapsulation 11 contains a second electronic unit 12 and a requisite power source. Any attempt to make a hole in the casing 11 or to attempt to open the casing will result in destruction of the coding of the key 10. The key 10 also includes an operating button 13.

The electronic unit 12 of the key 10 can be loaded with codes and possible other information, by temporarily connecting programming equipment to a socket provided to this end. The key 10 also includes means 14 which enables the electronic unit 12 to communicate with the electronic unit 2 of the container 1 when necessary through the medium of electromagnetic waves (for example, infrared light, so-called IR light).

The electronic unit 2 in the container 1 can be loaded with codes and possibly other information by connecting programming equipment temporarily to a socket provided to this end. The container 1 also includes means 3 which enables the electronic unit 2 to communicate with the electronic unit 12 of the key 10 when necessary, for instance by electromagnetic waves (for example, infrared light, so-called IR light).

The communication between the electronic unit 12 of the key 10 and the electronic unit 2 of the container 1 is illustrated with a double arrow 50. This communication may be a wireless communication, range limited and based on IR light. The communication may, of course, be achieved temporarily by means of a male-female connection between concerned electronic units.

FIG. 1 illustrates in larger scale a stationary second key 20 that includes a capsule in the form of, for instance, a circular outer casing 21 which is equipped with an alarm system which will cause all types of unauthorised action on the casing 21, such as attempts to make holes in the casing or attempts to open the casing, to be indicated. Arranged in the outer casing 21 is a third electronic unit 22. Any attempt to make a hole in the casing 21 or an attempt to open the casing will result in destruction of the coding of key 20.

The outer casing 21 may be comprised of hardened steel or some other not readily forced material. The illustrated capsule or casing 21 has an outer circular shape and includes an end wall 23, a barrel surface 24 and a circular connection flange 25. The casing 21 that protects the electronic unit 22 is firmly attached to a permanent part 60 of the building where it will be used. The attachment can e.g. be achieved by means of a strong center screw 26 and additional screws 27 through the flange 25. An attempt to remove the key 20 from its mounting structure 60 can be indicated so that an attempt to remove the stationary or wall-mounted key 20 will result in the destruction of the coding of said key.

The key 20 includes means for communicating with the key 10. These means may consist of one or more leads 28, which can be connected temporarily to the key 10 via a coupling point 30. In addition to code communication between key 10 and key 20, the lead/leads 28 may also convey operating current to the key 20 from the power source of the key 10, therewith obviating the need to provide the key 20 with its own power source.

The inventive process of opening a transportable container is as follows. Let us assume that a complete code-set ABCD is required for initiating deactivation of the alarm system and/or for opening the transportable security container 1.

Because the electronic unit 12 of the first key 10 contains a first code subset, for instance in the form of codes AB, and the electronic unit 22 of the second key 20 contains a second code subset in the form of codes CD, for instance, the two keys 10 and 20 will together contain the complete code-set ABCD required to initiate deactivation of the alarm system and/or to allow the transportable container 1 to be opened. Thus, it is necessary for the first key 10 and the second key 20 to be used simultaneously in order to deactivate said alarm and/or to enable the container to be opened. Thus, the container can only be deactivated and/or opened at determined destinations or geographical positions where a stationary second key 20 is kept. Since the first key 10 contains only the code subset AB when separate from the second key 20, the loss of the first key does not constitute a risk that the valuable contents of the container will be accessed unlawfully with the aid of the first key alone. Access to the container contents can thus only be achieved at said determined geographical positions at which the second key 20 is stationed, with simultaneous access to the first key 10.

It will be understood that communication between the first key 10 and the second key 20 may be achieved in a wireless and range restricted fashion. For example, the second key 20 may be loaded with its code subset CD upon primary communication with the first key 10, said code subset CD therewith permanently leaving the key 10 so as to be stored solely in the key 20 thereafter.

It will also be understood that communication between the keys 10,20 and the security container 1 may be of a very advanced nature, including a number of reciprocal code exchanges and code conversions. However, a central feature of the invention is that the keys 10 and 20 share the complete code-set required to initiate deactivation and/opening of the container 1.

When physically coupling the two keys 10 and 20 together with the container 1 in conjunction with deactivating the container alarm and/or opening said container, the two keys may be supplied with electrical power from the power source of the container 1, if so desired.

As will be understood, many variations are possible within the scope of the invention with regard to the structural design of the keys 10,20, their code content and possibly also their code converting ability, for example.

The level of security can be further enhanced, for example against robbery, by supplementing the present invention with a so-called real time protection, by which is meant that the container can only be opened at its intended destination within a given time interval or time window.

In a simplified embodiment that lies within the scope of the invention, the stationary second key may be simplified with respect to its encapsulation and securement, among other things. For example, the second key may be attached to a chain or a wire or some technically corresponding arrangement. When necessary, the encapsulation may consist of a plastic casing or the like.

It will therefore be understood that the invention is not restricted to the illustrated and described embodiment, since changes and modifications are conceivable within the scope of the accompanying claims.

The invention claimed is:

1. A process of opening a container for a transportation of valuable objects or valuable documents, wherein the container (1) includes a first electronic unit (2) which functions to allow deactivation of an alarm system and/or opening of the container, and wherein a first container-opening key (10) includes a second electronic unit (12) adapted to communicate with the first electronic unit (2) when initiating opening of said container, said container including means for destroying the valuable objects or documents contained therein unless said alarm system is deactivated by a full code-set (ABCD) when opening the container, characterised by a step of using a stationarily disposed second key (20) together with the first key (10) for simultaneously completing the full code-set (ABCD) required to initiate deactivation of said alarm system and/or opening of the container (1) without destroying the valuable objects or documents within said container, said stationarily disposed second key being fixedly and permanently mounted to a portion of a structure at a predetermined location in which the container is to be opened.

2. A process according to claim 1, characterised in that the stationarily disposed second key (20) includes a third electronic unit (22) which contains a subset (CD) of the complete code-set (ABCD) required to initiate deactivation of said alarm system and/or opening of the container (1).

3. A process according to claim 1, characterised in that the electronic unit (12) of the first key (10) includes a subset (AB) of the complete code-set (ABCD) required to initiate deactivation of the alarm system and/or opening of the container (1).

4. A process according to claim 1, characterised by another step of deactivating the alarm system and/or opening the container when the first key (10) is in the geographic vicinity of the second key (20) and/or physically connected to said second key, and deactivating the alarm system and/or opening of the container (1) only within a predetermined time period.

5. A process according to claim 1, characterised by another step of transferring from the first key to the second key (20) a subset (CD) of the complete code-set (ABCD) when said first key (10) is used together with the second key (20) for the first time, wherein said code subset (CD) is thereafter found only in the second key (20).

6. A process according to claim 1, characterised by another step of opening a dialog-like communication with the electronic unit (2) of the container (1) for allowing deactivation of the alarm system and/or opening of the container (1) to be completed, through the medium of code interplay when the complete code-set (ABCD) for initiating opening of the container (1) and deactivating the alarm system is provided.

7. A process according to claim 1, characterised by another step of stationarily installing the second key (20) in a room or in a space where deactivation of the alarm system and/or opening of the container (1) shall be initiated; and destroying a code subset (CD) contained in the second key (2) in response to an attempt to invalidate said stationary installation.

8. A process according to claim 1, characterised by another step of destroying a code subset (CD) contained by the second key (20) in response to damaging a casing (21) containing the stationary second key (20).

9. A process according to claim 1, characterised by another step of installing said stationary second keys (20) in a number of rooms or spaces included in the transportation route of transportable said containers (1).

10. An arrangement for carrying out the process according to claim 1, characterised in that the arrangement includes said second key (20) which has a third an electronic unit (22) for storing said code subset (CD); and in that said third electronic unit (22) of said second key (20) is encapsulated in a casing (21) which can be anchored stationarily to a permanent part (60) of a building structure or some other appropriate structure.

11. A process according to claim 2, characterised in that the electronic unit (12) of the first key (10) includes a subset (AB)

of the complete code-set (ABCD) required to initiate deactivation of the alarm system and/or opening of the container (1).

12. An arrangement for carrying out the process according to claim 2, characterised in that the arrangement includes said second key (20) which has said third electronic unit (22) for storing said code subset (CD); and in that said third electronic unit (22) of said second key (20) is encapsulated in a casing (21) which can be anchored stationarily to a permanent part (60) of a building structure or some other appropriate structure.

13. An arrangement for carrying out the process according to claim 3, characterised in that the arrangement includes said second key (20) which has a third electronic unit (22) for storing said code subset (CD); and in that said third electronic unit (22) of said second key (20) is encapsulated in a casing (21) which can be anchored stationarily to a permanent part (60) of a building structure or some other appropriate structure.

14. An arrangement for carrying out the process according to claim 4, characterised in that the arrangement includes said second key (20) which has a third electronic unit (22) for storing said code subset (CD); and in that said third electronic unit (22) of said second key (20) is encapsulated in a casing (21) which can be anchored stationarily to a permanent part (60) of a building structure or some other appropriate structure.

15. An arrangement for carrying out the process according to claim 5, characterised in that the arrangement includes said second key (20) which has a third electronic unit (22) for storing said code subset (CD); and in that said third electronic unit (22) or said second key (20) is encapsulated in a casing (21) which can be anchored stationarily to a permanent part (60) of a building structure or some other appropriate structure.

16. An arrangement for carrying out the process according to claim 6, characterised in that the arrangement includes said second key (20) which has a third electronic unit (22) for storing said code subset (CD); and in that said third electronic unit (22) of said second key (20) is encapsulated in a casing (21) which can be anchored stationarily to a permanent part (60) of a building structure or some other appropriate structure.

17. An arrangement for carrying out the process according to claim 7, characterised in that the arrangement includes said second key (20) which has a third electronic unit (22) for storing said code subset (CD); and in that said third electronic unit (22) of said second key (20) is encapsulated in a casing (21) which can be anchored stationarily to a permanent part (60) of a building structure or some other appropriate structure.

18. An arrangement for carrying out the process according to claim 8, characterised in that the arrangement includes said second key (20) which has a third electronic unit (22) for storing said code subset (CD); and in that said third electronic unit (22) of said second key (20) is encapsulated in a casing (21) which can be anchored stationarily to a permanent part (60) of a building structure or some other appropriate structure.

19. An arrangement for carrying out the process according to claim 9, characterised in that the arrangement includes said second key (20) which has a third electronic unit (22) for storing said code subset (CD); and in that said third electronic unit (22) of said second key (20) is encapsulated in a casing (21) which can be anchored stationarily to a permanent part (60) of a building structure or some other appropriate structure.

20. An arrangement of carrying out the process according to claim 11, characterised in that the arrangement includes said second key (20) which has said third electronic unit (22) for storing said code subset (CD); and in that said third electronic unit (22) of said second key (20) is encapsulated in a casing (21) which can be anchored stationarily to a permanent part (60) of a building structure or some other appropriate structure.

* * * * *